US009416975B2

(12) United States Patent
Myers

(10) Patent No.: US 9,416,975 B2
(45) Date of Patent: Aug. 16, 2016

(54) DUAL FUEL COMBUSTOR FOR A GAS TURBINE ENGINE INCLUDING A TOROIDAL INJECTION MANIFOLD WITH INNER AND OUTER SLEEVES

(71) Applicant: General Electric Company, Schenectady, NY (US)

(72) Inventor: Geoffrey D. Myers, Greenville, SC (US)

(73) Assignee: General Electric Company, Schenectady, NY (US)

( * ) Notice: Subject to any disclaimer, the term of this patent is extended or adjusted under 35 U.S.C. 154(b) by 455 days.

(21) Appl. No.: 14/017,509

(22) Filed: Sep. 4, 2013

(65) Prior Publication Data

US 2015/0059352 A1 Mar. 5, 2015

(51) Int. Cl.
*F02C 9/40* (2006.01)
*F23R 3/36* (2006.01)
*F02C 7/22* (2006.01)

(52) U.S. Cl.
CPC ..... *F23R 3/36* (2013.01); *F02C 7/22* (2013.01); *F02C 7/222* (2013.01); *F02C 9/40* (2013.01)

(58) Field of Classification Search
CPC ........ F02C 7/222; F02C 9/40; F05D 2240/36; F23D 7/00; F23D 9/00; F23D 11/40; F23D 2200/00; F23D 2202/00; F23D 2204/10; F23R 3/36; F23R 3/46
USPC .......................................................... 60/739
See application file for complete search history.

(56) References Cited

U.S. PATENT DOCUMENTS

| 2,922,279 | A | | 1/1960 | Roberson et al. |
| 4,040,252 | A | | 8/1977 | Mosier et al. |
| 4,045,956 | A | | 9/1977 | Markowski et al. |
| 4,047,877 | A | * | 9/1977 | Flanagan ................. F23R 3/40 431/353 |
| 4,112,676 | A | | 9/1978 | DeCorso |
| RE30,925 | E | | 5/1982 | Smith et al. |
| 4,742,684 | A | | 5/1988 | Sotheran |
| 5,359,847 | A | * | 11/1994 | Pillsbury et al. ........... 60/39.463 |
| 5,361,586 | A | * | 11/1994 | McWhirter ............ F23D 14/02 60/737 |
| 5,450,725 | A | | 9/1995 | Takahara et al. |
| 5,904,768 | A | * | 5/1999 | Holder .................... C30B 15/00 117/20 |
| 6,092,363 | A | * | 7/2000 | Ryan ........................ 60/39.463 |
| 6,112,511 | A | | 9/2000 | Myers |
| 2012/0125004 | A1 | | 5/2012 | Parsania et al. |

FOREIGN PATENT DOCUMENTS

GB 2143938 A * 2/1985

* cited by examiner

*Primary Examiner* — Phutthiwat Wongwian
*Assistant Examiner* — Marc Amar
(74) *Attorney, Agent, or Firm* — Sutherland Asbill & Brennan LLP

(57) ABSTRACT

The present application and the resultant patent provide a dual fuel combustor for a gas turbine engine. The combustor may include a primary premixer positioned within a head end plenum of the combustor, and a dual fuel injection system positioned within the head end plenum and upstream of the premixer. The injection system may be configured to inject a gas fuel about an inlet end of the premixer when the combustor operates on the gas fuel. The injection system also may be configured to vaporize and inject a liquid fuel about the inlet end of the premixer when the combustor operates on the liquid fuel. The present application and the resultant patent also provide a related method of operating a dual fuel combustor.

20 Claims, 4 Drawing Sheets

DUAL FUEL COMBUSTOR FOR A GAS TURBINE ENGINE INCLUDING A TOROIDAL INJECTION MANIFOLD WITH INNER AND OUTER SLEEVES

TECHNICAL FIELD

The present application and the resultant patent relate generally to gas turbine engines and more particularly relate to a dual fuel combustor for a gas turbine engine to control regulated emissions while maintaining acceptable operability when burning gas fuel or liquid fuel.

BACKGROUND OF THE INVENTION

Operational efficiency and the overall output of a gas turbine engine generally increases as the temperature of the hot combustion gas stream increases. Higher combustion gas stream temperatures, however, may produce higher levels of nitrogen oxides ($NO_X$) and other types of regulated emissions. A balancing act thus exists between the benefits of operating the gas turbine engine in an efficient high temperature range while also ensuring that the output of nitrogen oxides and other types of regulated emissions remain below mandated levels. Moreover, varying load levels, varying ambient conditions, and many other types of operational parameters and design requirements also may have a significant impact on overall gas turbine engine efficiency and emissions.

Lower emission levels of nitrogen oxides and the like may be promoted by mixing the feel stream and the air stream prior to combustion. Such premixing tends to reduce combustion temperature gradients and the output of nitrogen oxides. Certain combustors may include a premixer positioned upstream of a combustion zone and configured to mix at least portions of the fuel stream and the air stream prior to combustion. According to one known premixer configuration, a combustor may include a micro-mixer having an array of small tubes arranged within a plenum such that each tube mixes small volumes of the fuel stream and the air stream upstream of the combustion zone.

In many gas turbine engine applications, it may be desirable to have a combustor that is capable of operating on either gas fuel, such as natural gas or syngas, or liquid fuel, such as diesel fuel, kerosene, ethanol, or a water and oil mixture. Such fuel flexibility, however, often requires complex and costly feel injection systems that may sacrifice operability or performance when operating on one type of fuel or the other. Moreover, adapting such fuel injection systems to operate in conjunction with a premixer, such as a micro-mixer, may present substantial challenges in fuel injection as well as maintaining nitrogen oxides and other types of regulated emissions below mandated levels. Because liquid fuels may be about fifty times denser than gas feels, the injection ports and fuel delivery networks required to inject liquid fuel into each tube of the micro-mixer would need to be much smaller and more complex than those typically used to inject gas fuel in a similar manner. However, because liquid fuels are prone to thermal breakdown or coking within fuel passages at higher temperatures (e.g., about 290° F.), the fuel delivery networks would likely coke shut after only a few minutes of delivering liquid fuel to the micro-mixer.

Certain dual fuel combustors may be configured to inject gas fuel in the combustor during one mode of operation, and to inject and vaporize liquid fuel in the combustor during another mode of operation. Such injection and vaporization of the liquid fuel, however, may result in increased risk of auto-ignition, carbon formation, flashback, and flame holding at the head end of the combustor. According to one known combustor configuration, modifications to the injection system to address these risks may negatively impact the ability to burn gas fuel with acceptable operability. According to another known combustor configuration, the liquid, fuel may be vaporized outside of the combustor in an auxiliary vapor production system and then injected into the combustor through the gas fuel injection system. The vapor production system may require large quantities of an inert gas, such as nitrogen, and ultimately may increase parasitic loads, complexity, and cost of the overall gas turbine engine. Other dual fuel combustors may be configured to inject fuel into a secondary combustion stage and thus would not be compatible with a primary fuel premixer, such as a micro-mixer, in a primary combustion stage. Accordingly, such combustors may present challenges in maintaining nitrogen oxides and other types of regulated emissions below mandated levels. Still other dual fuel combustors may be configured to vaporize liquid fuel within the combustion zone, which also would not be compatible with a primary fuel premixer and may present challenges in emissions control.

There is thus a desire for an improved dual fuel combustor configured to inject gas fuel in the combustor during one mode of operation, and to inject and vaporize liquid fuel in the combustor during another mode of operation. Specifically, such a combustor should address the risks of auto-ignition, carbon formation, flashback, and flame holding, while providing acceptable operability when burning gas fuel or liquid fuel. Further, such a combustor should include a fuel injection system that is compatible with a primary fuel premixer and maintains regulated emissions below mandated levels, while also minimizing cost and complexity of the overall gas turbine engine.

SUMMARY OF THE INVENTION

The present application and the resultant patent thus provide a dual fuel combustor for a gas turbine engine. The combustor may include a primary premixer positioned within a head end plenum of the combustor, and a dual fuel injection system positioned within the head end plenum and upstream of the premixer. The injection system may be configured to inject a gas fuel about an inlet end of the premixer when the combustor operates on the gas fuel. The injection system also may be configured to vaporize and inject a liquid fuel about the inlet end of the premixer when the combustor operates on the liquid fuel.

The present application and the resultant patent also provide a method of operating a dual fuel combustor. The method may include the steps of directing a flow of air into a dual fuel injection system positioned within a head end plenum of the combustor, and directing a How of liquid fuel into the injection system. The method also may include the steps of vaporizing the flow of liquid fuel within the injection system, and injecting the flow of vaporized fuel about an inlet end of a primary premixer.

The present application and the resultant patent further provide a gas turbine engine system. The system may include a compressor, a dual fuel combustor in communication with the compressor, and a turbine in communication with the combustor. The combustor may include a primary premixer positioned within a head end plenum of the combustor, and a dual fuel injection system positioned within the head end plenum and upstream of the premixer. The injection system may be configured to inject a gas fuel about an inlet end of the premixer when the combustor operates on the gas fuel. The injection system also may be configured to vaporize and inject a liquid fuel about the inlet end of the premixer when the combustor operates on the liquid fuel.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
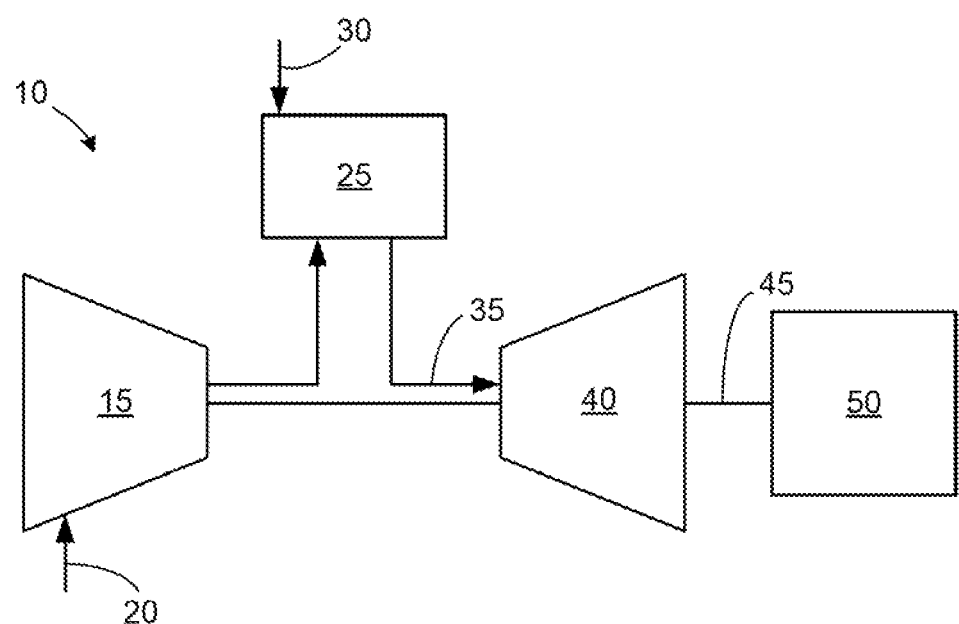
FIG. 1 is a schematic diagram of a gas turbine engine including a compressor, a combustor, and a turbine.

Referring now to the drawings, in which like numerals refer to like elements throughout the several views. FIG. 1 shows a schematic view of a gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of feel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like. Other configurations and other components may be used herein.

The gas turbine engine 10 may use natural gas, liquid fuels, various types of syngas, and/or other types of fuels and combinations thereof. The gas turbine engine 10 may be airy one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
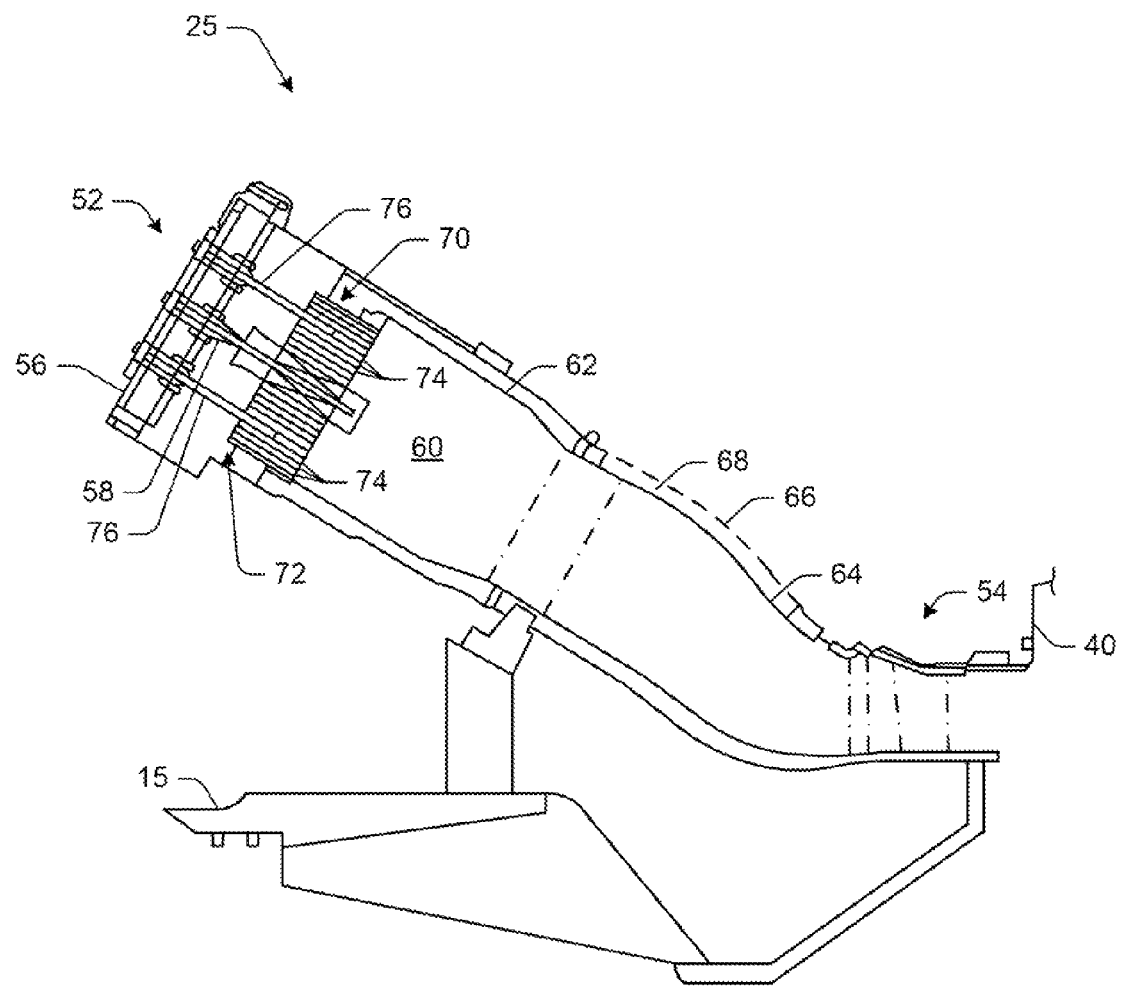
FIG. 2 is a side cross-sectional view of a combustor as may be used in the gas turbine engine of FIG. 1, the combustor including a primary premixer.

FIG. 2 shows a side cross-sectional view of an example of the combustor 25 as may be used in the gas turbine engine 10 described above and the like. The combustor 25 may extend from an upstream or head end 52 to a downstream or aft end 54 positioned adjacent the turbine 40. The combustor 25 may include an end cover 56 positioned at the head end 52 and a number of fuel nozzles 58 positioned about the end cover 56. Any number of fuel nozzles 58 may be used in any configuration. The fuel nozzles 58 may be in fluid communication with a fuel source (not shown) that generates the flow of fuel 30. As is shown, the fuel nozzles 58 may be attached to the end cover 56 and may extend downstream therefrom to a combustion zone 60 of the combustor 25. The combustor 25 also may include a liner 62 extending from the downstream ends of the fuel nozzles 58 to a transition, piece 64 positioned near the aft end 54 of the combustor 25. In this manner, the liner 62 may define the combustion zone 60 therein, and the transition piece 64 may provide fluid communication between the combustion, zone 60 and the turbine 40. The liner 62 may be surrounded by a flow sleeve 66, such that a flow path 68 is defined therebetween for receiving a flow of air, such as the compressed flow of air 20 from the compressor 15, therethrough.

The combustor 25 further may include a primary premixer, such as a micro-mixer 70, positioned about the fuel, nozzles 58 and within, a head end plenum 72 of the combustor 25 upstream of the combustion zone 60, as is shown. The micro-mixer 70 may include a number of micro-mixer tubes 74 positioned about one or more fuel tubes 76. The micro-mixer tubes 74 generally may have substantially uniform diameters and may be arranged in annular, concentric rows. Any number of the micro-mixer tubes 74 and the fuel tubes 76 may be used herein in any size, shape, or configuration. The fuel tubes 76 may be in fluid communication with the fuel source that generates the flow of fuel 30 and may be configured to deliver a small portion of the flow of fuel 30 into each of the micro-mixer tubes 74.

During operation of the combustor 25, the flow of air 20 from the compressor 15 may be directed through the flow path 68 and into the head end plenum 72 of the combustor 25. Each of the fuel nozzles 58 may direct a portion of the flow of air 20, a portion, of the flow of fuel 30, and optional, flows of other fluids into the combustion, zone 60 for mixing and combustion therein. Meanwhile, each of the micro-mixer tubes 74 may receive a small portion of the flow of air 20 from the flow path 68 and a small portion of the flow of fuel 30 from the fuel tube 76 for mixing within the micro-mixer tube 74. The mixed fuel-air flows may pass from the micro-mixer 70 into the combustion zone 60 for combustion therein. The resulting flow of combustion gases 35 then may be directed through the transition piece 64 and into the turbine 40 so as to produce useful work therein. Any number of the combustors 25 may be used in a can-annular array or other configurations. Moreover, the combustor 25 described and shown herein is for the purpose of example only. Combustors including other components also may be used herein.

Figure 3:
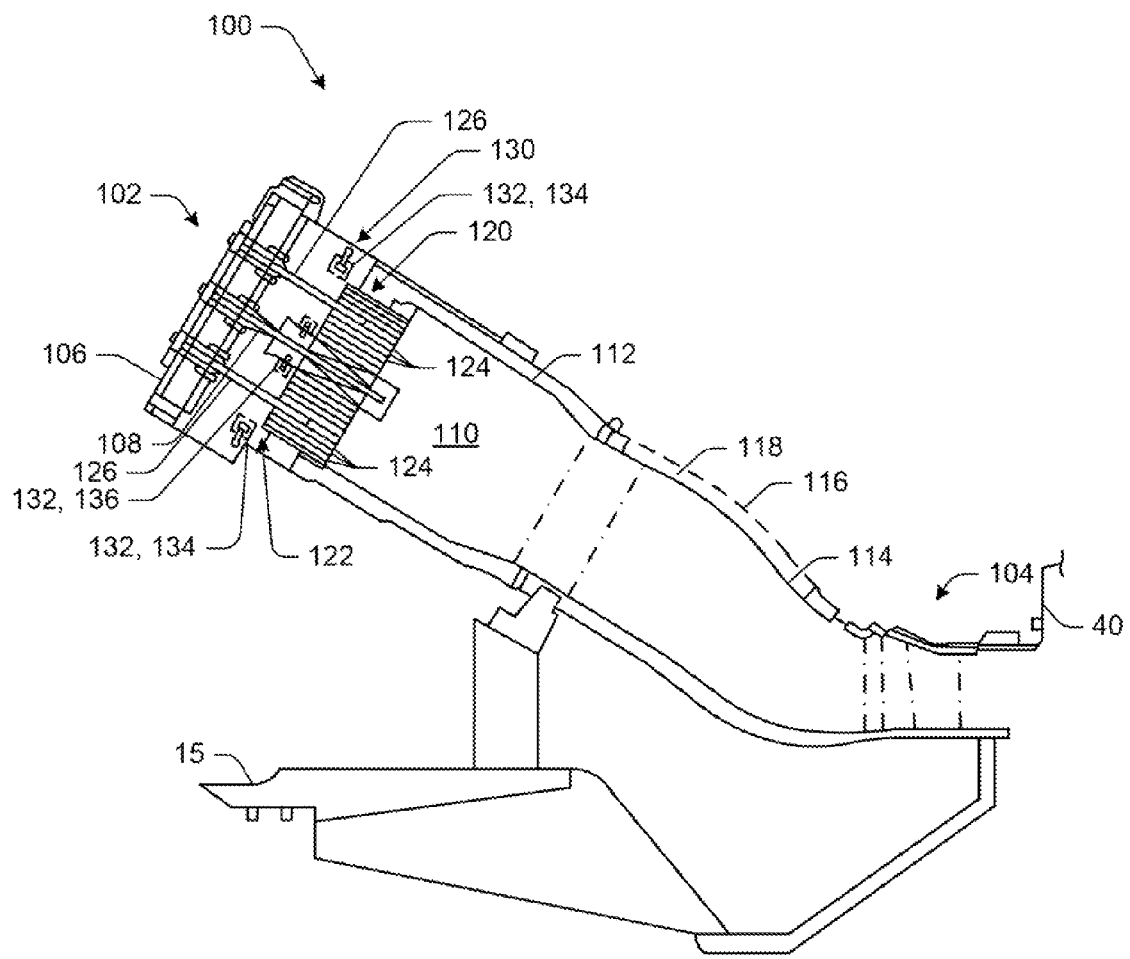
FIG. 3 is a side cross-sectional view of a dual fuel combustor as may be described herein and may be used in the gas turbine engine of FIG. 1, the dual feel combustor including a primary premixer and a dual fuel injection system.

FIG. 3 shows a side cross-sectional view of one embodiment of a dual fuel combustor 100 as may be described herein. The combustor 100 may be used in the gas turbine engine 10 described above and the like. The combustor 100 may extend from an upstream or head end 102 to a downstream or aft end 104 positioned adjacent the turbine 40. The combustor 100 may include an end cover 106 positioned at the head end 102 and a number of fuel nozzles 108 positioned about the end cover 106. Any number of fuel nozzles 108 may be used in any configuration. The fuel nozzles 108 may be in fluid communication with a fuel source (not shown) that generates the How of fuel 30. As is shown, the fuel nozzles 108 may be attached to the end cover 106 and may extend downstream therefrom to a combustion zone 110 of the combustor 100. The combustor 100 also may include a liner 112 extending from the downstream ends of the fuel, nozzles 108 to a transition piece 114 positioned near the aft end 104 of the combustor 100. In this manner, the liner 112 may define the combustion zone 110 therein, and the transition piece 114 may provide fluid communication between the combustion zone 110 and the turbine 40. The liner 112 may be surrounded by a flow sleeve 116, such that a flow path 118 is defined therebetween for receiving a flow of air, such as the compressed flow of air 20 from the compressor 15, therethrough.

The combustor 100 further may include a primary premixer, such as a micro-mixer 120, positioned about the fuel nozzles 108 and within a head end plenum 122 of the combustor 100 upstream of the combustion zone 110, as is shown. The micro-mixer 120 may include a number of micro-mixer tubes 124 positioned about one or more fuel tubes 126. The micro-mixer tubes 124 generally may have substantially uniform, diameters and may be arranged in annular, concentric rows. Any number of the micro-mixer tubes 124 and the fuel tubes 126 may be used herein in any size, shape, or configuration. The fuel tubes 126 may be in fluid communication with the fuel source that generates the flow of fuel 30 and may be configured to deliver a small portion of the flow of fuel 30 into each of the micro-mixer tubes 124.

As is shown in FIG. 3, the combustor 100 also may include a dual fuel injection system 130 positioned within the head end plenum 122 and upstream of the micro-mixer 120. The dual fuel injection system 130 may be in fluid communication with the fuel source that generates the flow of fuel 30 and may be configured to inject a gas fuel or a liquid fuel into the combustor 100. In other words, the dual fuel injection system 130 may be configured to inject the gas fuel into the combustor 100 when the combustor operates on the gas fuel, and the dual fuel injection system 130 may be configured to inject the liquid fuel into the combustor 100 when the combustor operates on the liquid fuel. Specifically, the dual fuel injection system 130 may be configured to inject a portion of the flow of fuel 30 about an inlet end of the micro-mixer 120.

The dual fuel injection system 130 may include at least one toroidal injection manifold 132 extending about a circumference of the micro-mixer 120 and being coaxial with the axis of the combustor 100. Specifically, as is shown, the dual, fuel injection system 130 may include an outer toroidal injection manifold 134 extending about an outer circumference of the micro-mixer 120 and configured to inject a portion of the flow of fuel 30 radially inward about the inlet end of the micro-mixer 120. The dual fuel injection system 130 also may include an inner toroidal injection manifold 136 extending about an inner circumference of the micro-mixer 120 and configured to inject a portion of the flow of fuel 30 radially outward about the inlet end of the micro-mixer 120. In certain embodiments, the dual fuel injection system 130 may include only the outer toroidal injection manifold 134, only the inner toroidal injection manifold 136, or both the outer toroidal injection manifold 134 and the inner toroidal injection manifold 136.

Figure 4:
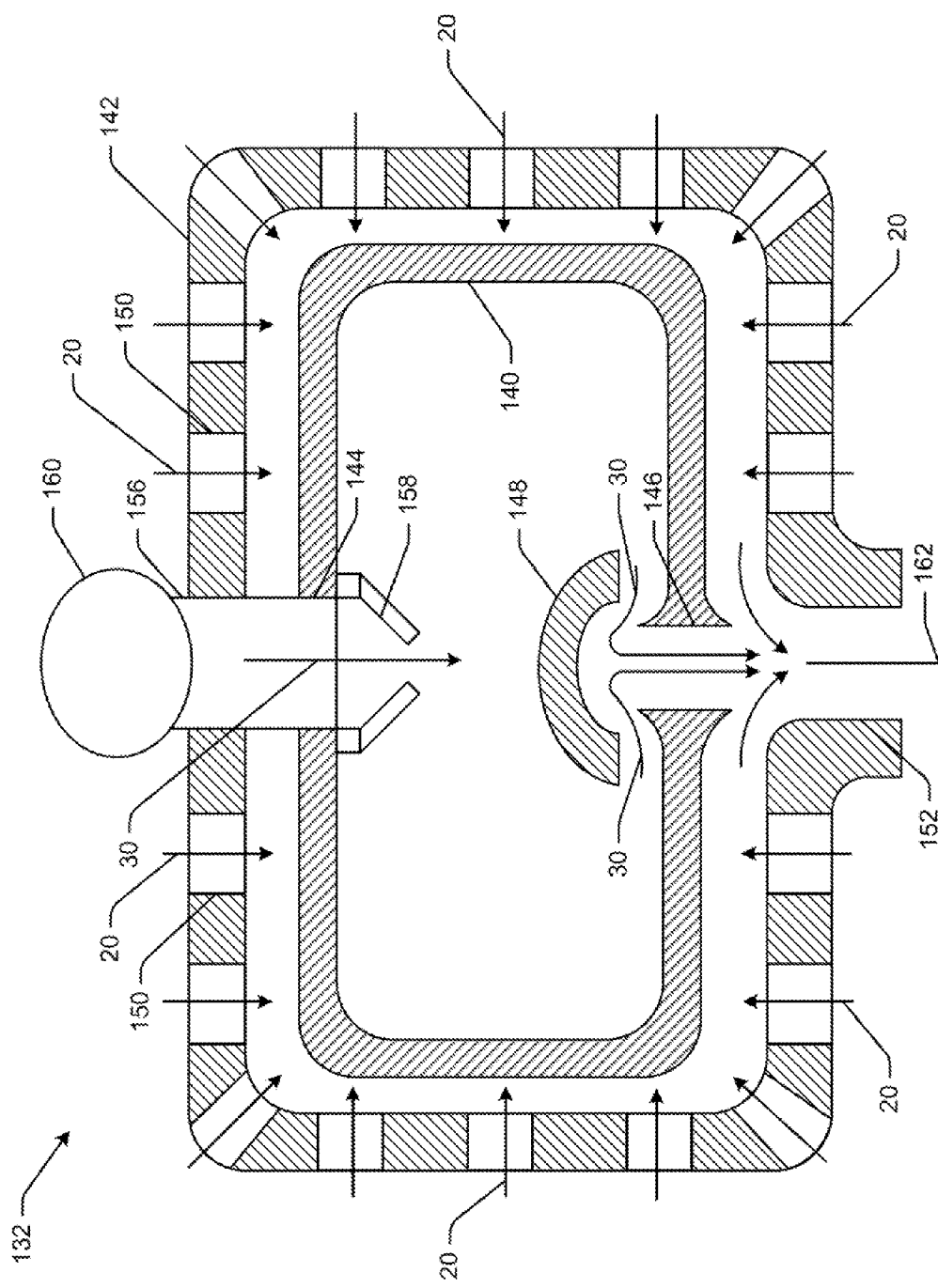
FIG. 4 is a detailed cross-sectional view of a portion of a toroidal injection manifold of the dual fuel injection system of FIG. 3.

FIG. 4 shows a detailed cross-sectional view of a portion of the toroidal injection manifold 132. The features shown are similarly applicable to both the outer toroidal injection manifold 134 and the inner toroidal injection manifold 136, although differences in the orientation of certain features are described below. The toroidal injection manifold 132 may include an internal sleeve 140 and an external sleeve 142, each having a toroidal shape. As is shown, the external sleeve 142 may surround the internal sleeve 140 and may support the toroidal injection manifold 132 within the head end plenum 122 of the combustor 100. Although the internal sleeve 140 and the external sleeve 142 are shown as having a generally rectangular cross-sectional shape, the internal, and external sleeves 140, 142 alternatively may have a generally square, circular, oval, or other cross-sectional shape.

The internal sleeve 140 may include one or more inlets 144 extending along a circumference of the internal sleeve 140 and one or more outlets 146 extending along an opposite circumference of the internal sleeve 140. As is shown, the outlet 146 may be formed as a continuous slot extending along the entire circumference of the internal sleeve 140. For the outer toroidal injection manifold 134, the inlet 144 may extend along the outer circumference of the internal sleeve 140, and the outlet 146 may extend along the inner circumference of the internal sleeve 140, with respect to the axis of the injection manifold 134. In contrast, for the inner toroidal injection manifold 136, the inlet 144 may extend along the inner circumference of the internal sleeve 140, and the outlet 146 may extend along the outer circumference of the internal sleeve 140, with respect to the axis of the injection manifold 136. As is shown, the internal sleeve 140 also may include a circumferential shield 148 extending between the inlet 144 and the outlet 146.

The external sleeve 142 may include a number of holes 150 extending through the external sleeve 142, as is shown in FIG. 4. The holes 150 generally may have substantially uniform diameters and may be defined on the inner circumference, outer circumference, and/or lateral surfaces of the external sleeve 142, with respect to the axis of the injection manifold 132. The external sleeve 142 also may include one or more outlets 152 extending along a circumference of the external sleeve 142. As is shown, the outlet 152 may be formed as a continuous slot extending along the entire circumference of the external sleeve 142. For the outer toroidal injection manifold 134, the outlet 152 may extend along the inner circumference of the external sleeve 142, with respect to the axis of the injection manifold 134. In contrast, for the inner toroidal injection manifold 136, the outlet 152 may extend along the outer circumference of the external sleeve 142, with respect to the axis of the injection manifold 136. As is shown, the outlet 152 may have a nozzle-like shape.

The toroidal injection manifold 132 also may include a number of pressure atomizers or fuel injectors 156 positioned and spaced apart along a circumference of the injection manifold 132. For the outer toroidal injection manifold 134, the fuel injectors 156 may be positioned along the outer circumference of the injection, manifold 134. In contrast, for the inner toroidal injection manifold 136, the fuel injectors 156 may be positioned along the inner circumference of the injection manifold 136. As is shown, the fuel injectors 156 may extend through the external sleeve 142 and into the internal sleeve 140. Specifically, the fuel, injectors 156 may extend through the one or more inlets 144 of the internal sleeve 140, which may be formed as holes or ports defined in the internal sleeve 140. The fuel injectors 156 may be in fluid communication with the fuel source that generates the flow of fuel 30 and thus may be configured to inject a portion of the flow of fuel 30 into the internal sleeve 140 of the injection manifold 132. In certain, embodiments, the fuel injectors 156 may be formed as plain jet injectors, pressure swirl injectors, or any other type of injectors. For example, the fuel injectors 156 may be formed as pressure-swirl injectors including a conical spin chamber 158, as is shown. The toroidal injection manifold 132 further may include a ring manifold 160 extending circumferentially about the fuel injectors 156 and in fluid communication with the fuel source. In this manner, the ring manifold 160 may be configured to deliver the portion of the flow of fuel 30 to the fuel injectors 156.

During operation of the combustor 100, the flow of air 20 from the compressor 15 may be directed through the How path 118 and into the head end plenum 122 of the combustor 100. Each of the fuel nozzles 108 may direct a portion of the flow of air 20, a portion of the flow of fuel 30, and optional flows of other fluids into the combustion zone 110 for mixing and combustion therein. Meanwhile, each of the toroidal injection manifolds 132 also may receive a portion of the flow of fuel 30 and a portion of the flow of air 20 for premixing within the injection manifolds 132 and subsequent injection about the inlet end of the micro-mixer 120. Each of the micro-mixer tubes 124 may receive a small portion of the premixed fuel-air flows for further mixing within the micro-mixer tube 124. In some embodiments, each of the micro-mixer tubes 124 also may receive a small portion of the flow of fuel 30 from the fuel tube 126 for mixing with the premixed fuel-air flow within the micro-mixer tube 124. In other embodiments, the micro-mixer tubes 124 may not receive any fuel from the fuel tube 126. The further-mixed fuel-air flows generated in the micro-mixer tubes 124 may pass from the micro-mixer 120 into the combustion zone 110 for combustion therein. The resulting flow of combustion gases 35 then may be directed through the transition piece 114 and into the turbine 40 so as to produce useful work therein. Any number of the combustors 100 may be used in a can-annular array or other configurations. Moreover, the combustor 100 described and shown herein is for the purpose of example only. Combustors including other components also may be used herein.

As noted above, the dual fuel injection system 130 may be configured to inject a liquid fuel such as diesel fuel, kerosene, ethanol, or a water and oil mixture, or a gas fuel, such as natural gas or syngas, into the combustor 100 for combustion therein. When the combustor 100 operates on the liquid fuel, the internal sleeve 140 of each of the toroidal injection manifolds 132 may receive a portion of the flow of fuel 30 via the fuel injectors 156. The circumferential shield 148 may prevent the flow of fuel 30 from immediately flowing out of the outlet 146. In this manner, the circumferential shield 148 may redirect the flow of fuel 30 within the internal sleeve 140 to facilitate contact between the liquid fuel and the internal surfaces of the sleeve 140 and to ensure that the liquid fuel has enough residence time within the internal sleeve 140 to vaporize completely. The internal sleeve 140 may be heated by a portion of the flow of air 20 directed through the holes 150 of the external sleeve 142 and impinging against outer surfaces of the internal sleeve 140. Such heating may cause the liquid fuel contacting the internal surfaces of the internal sleeve 140 to vaporize and may result in cooling of the flow of air 20. In certain embodiments, the internal surfaces of the internal sleeve 140 may include oleo phobic or hydrophilic coatings thereon to facilitate atomization and to reduce carbon formation. The internal sleeve 140 may be cooled by the continued flow of liquid fuel injected therein such that at steady state, the injection manifold 132 may operate at a temperature well below the temperature of the incoming flow of air 20 from the compressor 15. The vaporized fuel may flow out of the internal sleeve 140 via the outlet 146. Upon flowing through the outlet 146 of the internal sleeve 140, the flow of vaporized fuel may premix with the flow of cooled air, forming a premixed fuel-air flow 162. The cooled air may help delay auto-ignition of the premised fuel-air flow 162 produced by the injection manifold 132. As the premixed fuel-air flow 162 exits the injection manifold 132 via the outlet 152 of the external sleeve 142, the incoming flow of air 20 may be pulled through the holes 150 of the external sleeve 142 due to the nozzle-like shape of the outlet 152. In this manner, the outlet 152 may be configured to act like a jet pump or adductor. As noted above, the premixed fuel-air flow 162 may be injected as a sheet about the inlet end of the micro-mixer 120 such that each of the micro-mixer tubes 124 may receive a small portion of the premixed fuel-air flow 162 for further mixing therein. The combustor 100 may be configured such that the premixed fuel-air flow 162 travels from the outlet 152 to the outlet end of the micro-mixer 120 within a few milliseconds to avoid auto-ignition of the flow 162 upstream of the combustion zone 110. The auto-ignition temperature of the premixed fuel-air flow 162 may be well below the compressor discharge temperature, and thus the time required for the premixed fuel-air flow 162 to travel from the outlet 152 of the external sleeve 142 to the outlet end of the micro-mixer 120 may be less than the ignition delay time in order to avoid auto-ignition of the flow 162 within, the head end plenum 122.

When the combustor 100 operates on the gas fuel, the internal sleeve 140 of each of the toroidal injection manifolds 132 similarly may receive a portion of the flow of fuel 30 via the fuel injectors 156. The gas fuel may serve as a purging and cooling medium for the fuel injectors 156 while also allowing for optimization of fuel injection and combustion. The fuel injectors 156 may direct the flow of fuel 30 into the internal sleeve 140 in a continuous manner when the combustor 100 operates on the gas fuel. The continuous flow of the gas fuel may cool, purge, and flush the fuel-wetted internal surfaces of the toroidal injection manifold 132, particularly the internal sleeve 140, and thus may prevent air, specifically oxygen, from infiltrating the fuel-wetted internal surfaces. In this manner, the continuous flow of the gas fuel, may reduce the potential for coking or carbon formation, and may reduce the cost and complexity of purging as compared to systems that use nitrogen, steam, or an inert gas. As the internal sleeve 140 receives the flow of fuel 30, the circumferential shield 148 may prevent the flow of fuel 30 from immediately flowing out of the outlet 146. In this manner, the circumferential, shield 148 may redirect the flow of fuel 30 within the internal, sleeve 140 to facilitate contact between the gas fuel and the internal surfaces of the sleeve 140. The internal sleeve 140 may be heated by a portion of the flow of air 20 directed through the holes 150 of the external sleeve 142 and impinging against outer surfaces of the internal sleeve 140. Meanwhile, the internal sleeve 140 may be cooled by the continuous flow of gas fuel injected therein such that, at steady state, the injection manifold 132 may operate at a temperature well below the temperature of the incoming flow of air 20 from the compressor 15. The gas fuel may flow out of the internal sleeve 140 via the outlet 146. Upon flowing through the outlet 146 of the internal sleeve 140, the flow of gas fuel may premix with the flow of cooled air, forming a premixed fuel-air flow 162. The cooled air may help delay auto-ignition of the premixed fuel-air flow 162 produced by the injection manifold 132. As the premixed fuel-air flow 162 exits the injection manifold 132 via the outlet 152 of the external sleeve 142, the incoming flow of air 20 may be pulled through, the holes 150 of the external sleeve 142 due to the nozzle-like shape of the outlet 152. In this manner, the outlet 152 may be configured to act like a jet pump or adductor. Notably, when the combustor 100 operates on the gas fuel, the volume of the incoming flow of air 20 being pulled through the holes 150 is far less as compared to when the combustor 100 operates on the liquid fuel because of the lower gas fuel temperatures, mass flows, and heat transfer to the internal surfaces of the internal sleeve 140. Ultimately, as noted above, the premixed fuel-air flow 162 may be injected as a sheet about the inlet end of the micro-mixer 120 such that each of the micro-mixer tubes 124 may receive a small portion of the premixed fuel-air flow 160 for further mixing therein.

The dual fuel combustor described herein thus provides an improved dual fuel combustor configured to inject gas fuel into the combustor 100 during one mode of operation, and to inject and vaporize liquid fuel in the combustor 100 during another mode of operation. The combustor 100 may be operated on the liquid fuel when the gas turbine engine 10 is operating at full load conditions and may be operated on the gas fuel when the combustor 100 is operating at partial load conditions. In doing so, the dual fuel injection system 130 may be used to maintain the overall output of nitrogen oxides and other types of regulated emissions below mandated levels. The combustor 100 generally may be operated on the gas fuel for the majority of it operating time. For example, the combustor 100 may be operated on the gas fuel for about 99.9% of its operating time. When the combustor 100 operates on the liquid fuel, the vaporization of the liquid fuel within the toroidal injection manifold 132 may result in leaner combustion with reduced flame temperatures and nitrogen oxides production. When the combustor 100 operates on the gas fuel, the continuous flow of the gas fuel may reduce the potential for coking or carbon formation, and may reduce the cost and complexity of purging as compared to systems that use nitrogen, steam, or an inert gas. Moreover, injection of the gas fuel via the toroidal injection manifold 132 may change the convection time between the point of fuel injection and the flame front within, the combustor 100, which may be helpful in mitigating or otherwise managing dynamic pressure oscillations when the combustor 100 operates on the gas fuel. The combustor 100 may also address the risks of auto-ignition, carbon formation, flashback, and flame holding as noted above, while maintaining the regulated emissions below mandated levels. Further, the combustor 100 may be compatible with a primary premixer while avoiding the high cost, complexity, and limited operability associated with certain dual fuel combustors as described in detail above.

The dual fuel combustor 100 also allows for optimization of fuel injection into the combustor 100 and subsequent combustion therein. Specifically, the portion of the flow of fuel 30 that is directed into the dual fuel injection system 130 may be adjusted to optimize injection, premising, and combustion. In certain embodiments, between 2% and 30% of the total flow of fuel 30 may be directed into the dual the injection system 130. Other percentages may be used. Moreover, the portion of the flow of air 20 that is directed into the dual fuel injection system 130 may be adjusted to optimize injection, premixing, and combustion. In certain embodiments, about 15% of the total flow of air 20 directed into the head end plenum 122 may be directed into the dual fuel injection system 130. Other percentages may be used. Further, according to embodiments including both the outer toroidal injection manifold 134 and the inner toroidal injection manifold 136, a fuel split ratio between the injection manifolds 134, 136 may be adjusted to optimize injection, premising, and combustion. In certain embodiments, the fuel split ratio between the outer toroidal injection manifold 134 and the inner toroidal injection manifold 136 may be about 4 to 1. In this manner, the dual fuel, injection system 130 may operate as a quaternary injection system optimized for injection, premixing, and combustion. Other fuel split ratios may be used.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A dual fuel combustor for a gas turbine engine, the combustor comprising:
    a primary premixer positioned within a head end plenum of the combustor; and
    a dual fuel injection system positioned within the head end plenum and upstream of the premixer and comprising at least one toroidal injection manifold extending about a circumference of the premixer, the toroidal injection manifold comprising:
        an external sleeve having a toroidal shape and an internal space defined between an inner wall and an outer wall of the external sleeve; and
        an internal sleeve having a toroidal shape and positioned within the internal space of the external sleeve;
    wherein the injection system is configured to inject a gas fuel about an inlet end of the premixer when the combustor operates on the gas fuel; and
    wherein the injection system is configured to vaporize and inject a liquid fuel about the inlet end of the premixer when the combustor operates on the liquid fuel.

2. The dual fuel combustor of claim 1, wherein the premixer comprises a micro-mixer comprising a plurality of micro-mixer tubes positioned about at least one fuel tube.

3. The dual fuel combustor of claim 1, wherein the toroidal injection manifold further comprises at least one fuel injector extending through the external sleeve and into the internal sleeve.

4. The dual fuel combustor of claim 1, wherein the internal sleeve is configured to receive a flow of the liquid fuel therein, and wherein the external sleeve is configured to direct a flow of air against the internal sleeve such that the liquid fuel vaporizes within the internal sleeve.

5. The dual fuel combustor of claim 4, wherein the external sleeve comprises a plurality of holes extending therethrough and configured to direct the flow of air against the internal sleeve.

6. The dual fuel combustor of claim 1, wherein the external sleeve supports the toroidal injection manifold within the head end plenum.

7. The dual fuel combustor of claim 1, wherein the internal sleeve comprises an inlet extending along a circumference of the internal sleeve, an outlet extending along an opposite circumference of the internal sleeve, and a circumferential shield extending between the inlet and the outlet.

8. The dual fuel combustor of claim 1, wherein the at least one toroidal injection manifold comprises an outer toroidal injection manifold extending about an outer circumference of the premixer and configured to inject the gas fuel or the liquid fuel radially inward about the inlet end of the premixer.

9. The dual fuel combustor of claim 1, wherein the at least one toroidal injection manifold comprises an inner toroidal injection manifold extending about an inner circumference of the premixer and configured to inject the gas fuel or the liquid fuel radially outward about the inlet end of the premixer.

10. The dual fuel combustor of claim 1, wherein the at least one toroidal injection manifold comprises an inner toroidal injection manifold and an outer toroidal injection manifold, and wherein a fuel split ratio between the inner toroidal injection manifold and the outer toroidal injection manifold is 4 to 1.

11. A method of operating a dual fuel combustor, the method comprising:
    directing a flow of air into a dual fuel injection system positioned within a head end plenum of the combustor, the injection system comprising at least one toroidal injection manifold comprising:
        an external sleeve having a toroidal shape and an internal space defined between an inner wall and an outer wall of the external sleeve; and
        an internal sleeve having a toroidal shape and positioned within the internal space of the external sleeve;
    directing a flow of liquid fuel into the injection system;

vaporizing the flow of liquid fuel within the injection system;

injecting the flow of vaporized fuel about an inlet end of a primary premixer.

12. A gas turbine engine system, comprising:
a compressor;
a dual fuel combustor in communication with the compressor; and
a turbine in communication with the combustor;
wherein the combustor comprises:
   a primary premixer positioned within a head end plenum of the combustor; and
   a dual fuel injection system positioned within the head end plenum and upstream of the premixer and comprising at least one toroidal injection manifold extending about a circumference of the premixer, the toroidal injection manifold comprising:
   an external sleeve having a toroidal shape and an internal space defined between an inner wall and an outer wall of the external sleeve; and
   an internal sleeve having a toroidal shape and positioned within the internal space of the external sleeve;
   wherein the injection system is configured to inject a gas fuel about an inlet end of the premixer when the combustor operates on the gas fuel; and
   wherein the injection system is configured to vaporize and inject a liquid fuel about the inlet end of the premixer when the combustor operates on the liquid fuel.

13. The system of claim 12, wherein the premixer comprises a micro-mixer comprising a plurality of micro-mixer tubes positioned about at least one fuel tube.

14. The system of claim 12, wherein the toroidal injection manifold further comprises at least one fuel injector extending through the external sleeve and into the internal sleeve.

15. The system of claim 12, wherein the internal sleeve is configured to receive a flow of the liquid fuel therein, and wherein the external sleeve is configured to direct a flow of air against the internal sleeve such that the liquid fuel vaporizes within the internal sleeve.

16. The system of claim 15, wherein the external sleeve comprises a plurality of holes extending therethrough and configured to direct the flow of air against the internal sleeve.

17. The system of claim 12, wherein the internal sleeve comprises an inlet extending along a circumference of the internal sleeve, an outlet extending along an opposite circumference of the internal sleeve, and a circumferential shield extending between the inlet and the outlet.

18. The system of claim 12, wherein the at least one toroidal injection manifold comprises an outer toroidal injection manifold extending about an outer circumference of the premixer and configured to inject the gas fuel or the liquid fuel radially inward about the inlet end of the premixer.

19. The system of claim 12, wherein the at least one toroidal injection manifold comprises an inner toroidal injection manifold extending about an inner circumference of the premixer and configured to inject the gas fuel or the liquid fuel radially outward about the inlet end of the premixer.

20. The system of claim 12, wherein the at least one toroidal injection manifold comprises an inner toroidal injection manifold and an outer toroidal injection manifold, and wherein a fuel split ratio between the inner toroidal injection manifold and the outer toroidal injection manifold is 4 to 1.

* * * * *